(No Model.)
A. K. EATON.
GALVANOMETER.
No. 292,161. Patented Jan. 22, 1884.
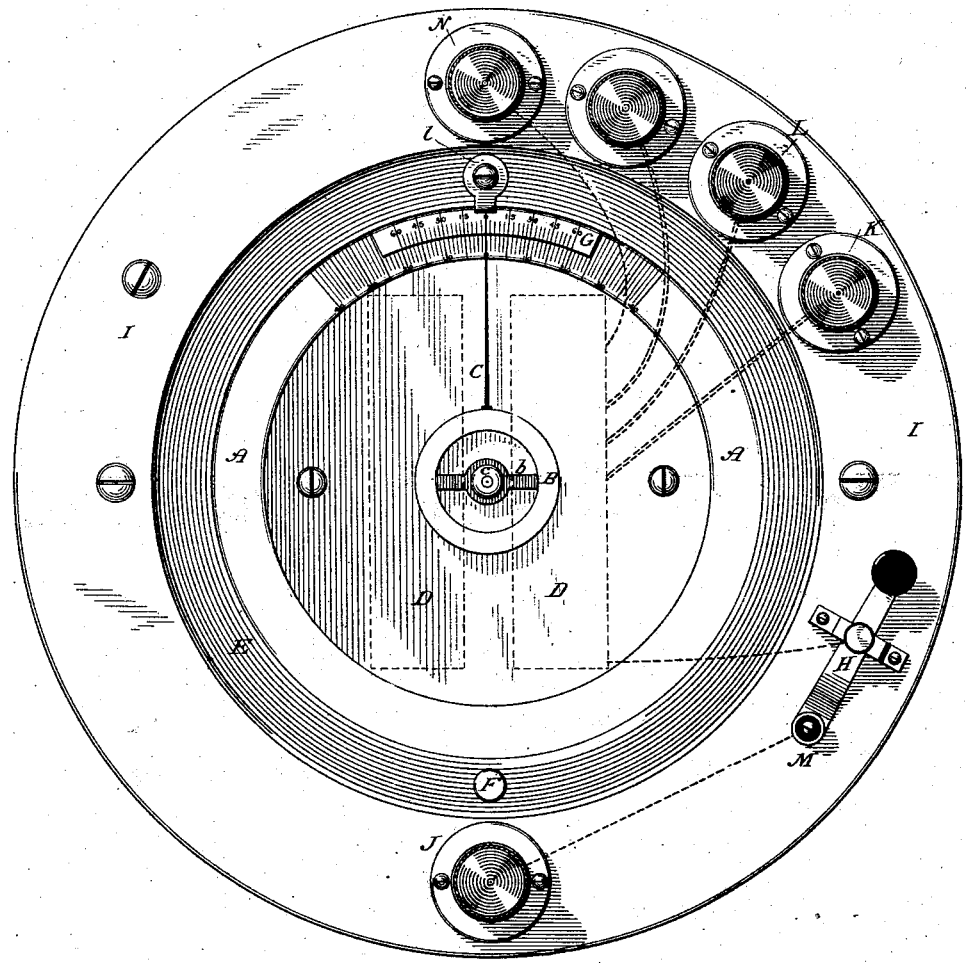
Attest:
Raymond F. Barnes.
W. Frisby
Inventor:
Asahel K. Eaton
By Parker W. Page
atty.

UNITED STATES PATENT OFFICE.

ASAHEL K. EATON, OF BROOKLYN, NEW YORK.

GALVANOMETER.

SPECIFICATION forming part of Letters Patent No. 292,161, dated January 22, 1884.

Application filed April 16, 1883. (No model.)

*To all whom it may concern:*

Be it known that I, ASAHEL K. EATON, a citizen of the United States, and a resident of Brooklyn, in the county of Kings and State of New York, have invented certain new and useful Improvements in Galvanometers, of which the following is a specification, reference being had to the drawing accompanying and forming a part of the same.

This invention relates to improvements in the construction of galvanometers; and its object is to produce an instrument which is more particularly designed as a volt-meter to be used in the direct determination of the electro-motive force of any given current, but which shall also be capable of other uses, and shall be more accurate and easy of manipulation than devices of this kind now in use.

I will first explain the principle of the construction and operation of the instrument invented by me by reference to the accompanying drawing, and then explain the general objects and advantages gained thereby.

The drawing hereto annexed is a plan view of a galvanometer constructed in accordance with my invention.

The letters I I designate the box or casing in which the operative portions of the instrument are contained. In the central portion of casing I are placed the coils D D. These are composed of fine wire wound in a number of layers, the coils being separated to provide for the mounting between them of the needle. To render the instrument capable of more extended uses, I wind the coils D D in the following manner: After winding a certain number of layers of convolutions upon an insulating block or shell in the ordinary manner, I carry out the wire to a binding-post, as K, to which it is connected, and then brought back, and the winding continued. After a certain additional number of layers are formed, the wire is again brought out to a second binding-post, L, and this plan is followed until the total length of coil desired is wound, the end of the wire being connected to a post, N. In this manner a sectional coil is produced which may be used in whole or in part, according to the character of the circuit with which it is to be used, or the resistance which it is desirable to have in the galvanometer-coils.

For a needle I employ a flat steel ring, B, which is magnetized with its poles in a diametrical line. The neutral points of the ring— or, as it is technically called, the "needle"—are joined by an aluminium bar, b, which carries an agate cup, c, that rests on a needle-point, or which may be pivoted or suspended in any other well-known manner. From the south or minus pole of the ring B extends an aluminium pointer, C, this metal being used principally on account of its lightness.

A A is a circular scale of the kind commonly employed, over which sweeps the end of the pointer C. Surrounding this scale is an annular and permanent magnet, E. This magnet is composed of a steel ring about square in cross-section, and magnetized to saturation, whether by contact with other magnets or by means of coils, in such manner that its poles are diametrically opposite. Magnet E is set in the casing I, so as to be capable of a free movement around the scale A in a horizontal plane. It is provided with a vernier, G, which is attached to its north pole by means of an ear, l, and may have also a button of wood or brass, F, by means of which it is readily turned.

J is one of the binding-posts by which the instrument is connected with a circuit. A wire leads from post J to a post, M, to which is connected a spring or other form of key or break, H, used in conjunction with a stop, forming one terminal of the coils D.

When no current is passing through the coils D, the poles of the annular magnetic needle B and of the ring E will be exactly in line, and will remain so in whatever direction the ring E may be turned.

To use the instrument as a volt-meter the posts J and N are connected with the circuit terminals. When the current is caused to circulate through the coils D, the annular needle B is at once turned against the attractive force of the ring E, for the reason that the convolutions of coils D are parallel to the line joining its poles when the pointer is on the zero-point of the scale A. The pointer C by this means having suffered a certain deflection, the ring E is turned to the right or to the left, as the case may be, until the pointer is brought back to the zero-point on the scale A. The position of the zero of the vernier G will indicate the electro-motive force of the current in units of the scale A, for by shifting the poles of the magnetized ring so as to keep the pointer on the zero of the scale the poles of the needle B are kept in a line parallel with the convolutions of the coils D, or, in other words, in a position in which the maximum effect is exerted upon them. It is clear, therefore, that for every addition to the current strength an equivalent force will be added to that tending to deflect the needle, and that the ring must be still farther turned to resist such increase and keep the pointer still on the zero of scale A. Analogous effects take place on the weakening of the current, the position of the zero of the vernier, when the pointer C is on the zero of scale A, indicating in units of said scale the electro-motive force of the current measured. By thus providing the instrument with an annular magnet or a ring magnetized, as described, I obtain an artificial field, in which there is a symmetrical distribution of magnetic forces, and which takes the place of the terrestrial magnetic field of the ordinary galvanometer, and by using for the needle an annular magnet or, ring magnetized in the manner described the action of the coil or coils is so equalized that for equal increments of electro-motive force I obtain equal increments of deflection. For example, with the arrangement shown, if a current of one volt causes a deflection of the needle of one degree, ten volts will cause a deflection of ten degrees, and so on.

When very powerful currents are to be measured, the instrument may be adjusted, as by raising the pivotal point of the needle, so that a given unit of current-strength—say one volt—will cause a deflection of only one-half a degree or less, and as equal increments of electro-motive force produce equal increments of deflection an accurate determination of stronger currents may be readily obtained, a comparatively-small portion of the scale in this way being used for determining a very high electro-motive force. The amount of deflection per current unit may be readily ascertained for any degree of elevation of the needle B by observing the effect produced by one or more standard cells.

The ring E is made removable, and when it is taken off the instrument becomes an ordinary tangent galvanometer, and may be used as such under all conditions.

I have now described the best manner in which my invention is or may be carried into effect. In summarizing the invention, however, in the claims which follow, I do not restrict myself to the precise construction shown or described, as I may obtain the same results in substantially the same manner, but by parts differing somewhat in mechanical construction and design.

I am aware that permanent magnets have heretofore been used in conjunction with the magnetic needles of volt-meters and am-meters, and such I do not broadly claim. I am not aware, however, that the needles have ever been pivoted or suspended in a magnetic field in which the lines of force were symmetrical with respect to the center of motion of the needle, nor that a disk or annular magnetic needle has ever been employed with such a field, or any other.

What I therefore claim is—

1. A galvanometer consisting of a graduated scale, in combination with a coil or coils, a magnetic needle, and a magnetized ring producing a field symmetrical with respect to the center of motion of the needle, as set forth.

2. A galvanometer consisting of a graduated scale, in combination with a coil or coils, a magnetized ring, and a magnetic needle mounted in the center of said ring, substantially as herein set forth.

3. The combination, in a galvanometer, of a graduated scale, an annular magnet or magnetized ring, and an annular magnetic needle mounted in the center of said ring, substantially as described.

4. The combination, in a galvanometer, with an annular magnetic needle and a coil or coils, substantially as described, of an annular magnet or magnetized ring movable around the needle, as above set forth.

5. The combination, in a galvanometer, of an annular magnetic needle, a coil or coils with convolutions parallel to a line passing through the poles of said needle and the zero-point of the scale, and a removable annular magnet or magnetized ring, as and for the purpose set forth.

6. The combination, with a fixed circular scale, a movable annular magnet or magnetized ring, and a vernier attached thereto, of an annular magnetic needle, a pointer carried thereby, and a coil or coils, all as set forth.

7. The combination, with a magnetized annular galvanometer-needle, of a cross-bar of non-magnetic material, a pivotal support, and a pointer, all as described.

In testimony whereof I have hereunto set my hand this 13th day of April, 1883.

ASAHEL K. EATON.

Witnesses:
W. FRISBY,
RAYMOND F. BARNES.